United States Patent [19]
Hsu

[11] Patent Number: 5,778,709
[45] Date of Patent: Jul. 14, 1998

[54] VEHICLE STEERING WHEEL AND AIR BAG ANTITHEFT LOCKING APPARATUS

[76] Inventor: Henry Hsu, 112-15 Northern Blvd., Corona, N.Y. 11368

[21] Appl. No.: 976,369

[22] Filed: Nov. 21, 1997

Related U.S. Application Data

[63] Continuation of Ser. No. 615,863, Mar. 14, 1996, abandoned.

[51] Int. Cl.$^6$ ............................................. B60R 25/02
[52] U.S. Cl. .............................. 70/209; 70/226; 70/238
[58] Field of Search .................................. 70/14, 18, 19, 70/209–212, 225, 226, 237, 238

[56] References Cited

U.S. PATENT DOCUMENTS

| D. 357,621 | 4/1995 | Yang | D8/343 |
|---|---|---|---|
| 4,738,127 | 4/1988 | Johnson | 70/209 |
| 4,747,279 | 5/1988 | Solon | 70/199 X |
| 4,882,920 | 11/1989 | Wu | 70/209 |
| 5,005,388 | 4/1991 | Lo | 70/209 |
| 5,052,201 | 10/1991 | Liou | 70/209 |
| 5,119,651 | 6/1992 | Yang | 70/52 |
| 5,197,308 | 3/1993 | Pazik | 70/209 |
| 5,199,284 | 4/1993 | Lin | 70/209 |
| 5,229,438 | 7/1993 | Chen | 70/209 |
| 5,239,849 | 8/1993 | Gallardo | 70/209 |
| 5,275,030 | 1/1994 | Cole | 70/209 |
| 5,327,753 | 7/1994 | White | 70/209 |
| 5,415,018 | 5/1995 | Ferrante | 70/209 |
| 5,454,240 | 10/1995 | Whitney | 70/209 |
| 5,457,972 | 10/1995 | Lo | 70/209 |
| 5,537,847 | 7/1996 | Dalton et al. | 70/209 |
| 5,540,067 | 7/1996 | Kim | 70/209 |
| 5,555,753 | 9/1996 | Matlock | 70/209 |
| 5,566,560 | 10/1996 | LiCausi | 70/209 X |
| 5,595,078 | 1/1997 | Harrell | 70/209 |
| 5,636,538 | 6/1997 | Openiano | 70/209 |

FOREIGN PATENT DOCUMENTS

| 680416 | 4/1938 | Germany | 70/401 |
|---|---|---|---|
| 1127524 | 9/1968 | United Kingdom | 70/226 |
| 9204211 | 3/1992 | WIPO | 70/209 |

*Primary Examiner*—Suzanne Dino Barrett
*Attorney, Agent, or Firm*—Robert C. Kain, Jr.

[57] ABSTRACT

A steering wheel and air bag antitheft locking apparatus for preventing theft of a vehicle or air bag having a steering wheel with a wheel rim and a wheel spoke includes a tubular outer wheel spanning member having a receiving end and a handle end; an elongate inner wheel spanning member having an entry end and an outwardly protruding end, the entry end being telescopingly fitted into the outer wheel spanning member receiving end; where the inner wheel spanning member protruding end has attached a first pair of outwardly opening wheel rim engaging hooks; where one of the handle end and the protruding end protrudes substantially radially from the steering wheel when the apparatus is engaged to prevent turning of the steering wheel sufficiently to drive the vehicle; and where a second pair of outwardly opening wheel rim engaging hooks is attached to the outer wheel spanning member between the receiving end and the handle end; and a key operated locking mechanism which releasibly secures the inner and outer wheel spanning members together at any of several telescopic extensions, the locking mechanism including a key passageway; and a key for operating the locking mechanism including at least three radially extending key edged flanges. Pairs of wheel rim engaging hooks are preferably provided so that the wheel engaging hooks of each pair straddle the steering wheel spoke while engaging the steering wheel rim, to prevent a thief from removing the apparatus using a cut through the wheel rim and sliding one pair of hooks to and through the cut.

5 Claims, 3 Drawing Sheets

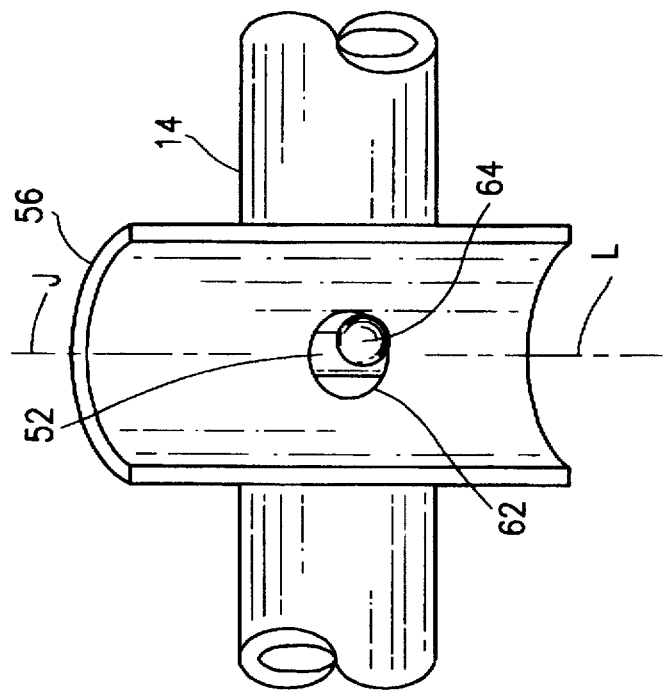
FIG. 4
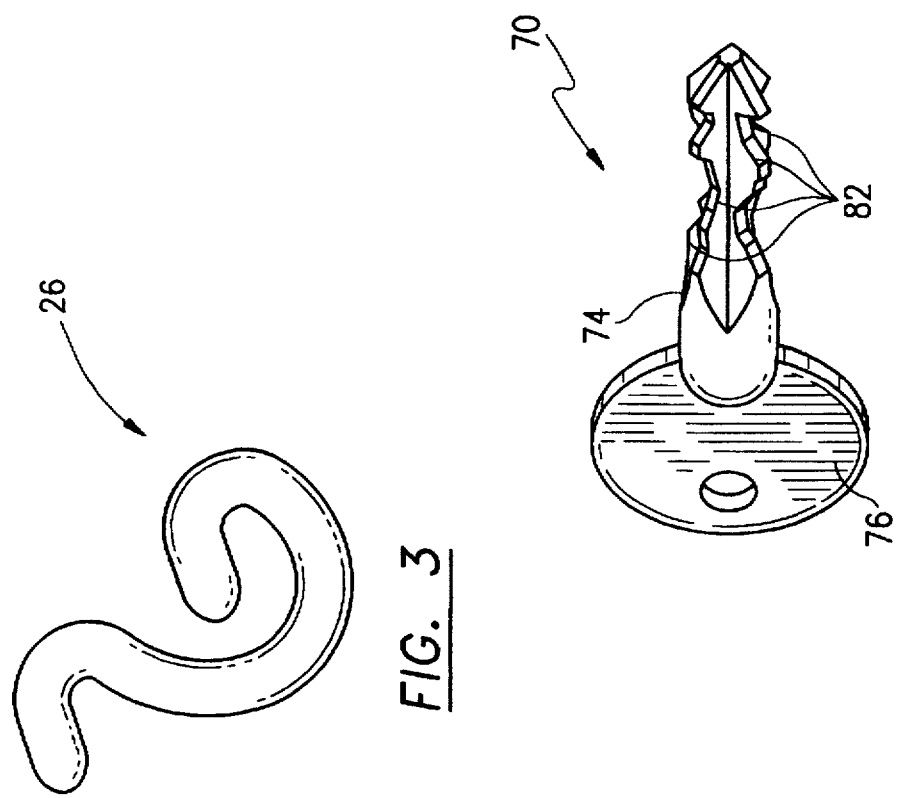
FIG. 3
FIG. 5

5,778,709

1

VEHICLE STEERING WHEEL AND AIR BAG ANTITHEFT LOCKING APPARATUS

This is a continuation of U.S. patent application Ser. No. 08/615,863 filed Mar. 14, 1996 which is now abandoned.

BACKGROUND OF THE INVENTION

1. Field of the Invention

The present invention relates generally to the field of vehicle security systems and antitheft locking devices. More specifically the present invention relates to a steering wheel and air bag antitheft locking apparatus including an elongate inner wheel spanning member telescopingly fit into a tubular outer wheel spanning member. When the apparatus engages the steering wheel, the remote end of the outer wheel spanning member protrudes substantially radially from the steering wheel a sufficient distance to prevent wheel rotation necessary to drive the vehicle.

A pair of outwardly opening and laterally spaced apart wheel rim engaging hooks is provided on each wheel spanning member. The wheel rim engaging hooks of each pair straddle a steering wheel spoke while engaging the steering wheel rim. This spoke straddling engagement prevents a thief from sliding the hooks to and out through a cut in the wheel rim such as done with a bolt cutter, and thereby removing the apparatus.

The outer wheel spanning member receiving end includes a key operated locking mechanism. The key includes a four flanged lock operating portion extending longitudinally from a planar gripping portion. The outer spanning member preferably includes an air bag protecting structure in the form of two opposing and outwardly bowed rigid U-shaped loops protruding laterally from the outer wheel spanning member to block air bag removal.

2. Description of the Prior Art

There have long been antitheft locking devices for vehicle steering wheels. One of the best known is sold under the trade name THE CLUB™. This type of device is disclosed in U.S. Pat. No. 4,738,127 issued on Apr. 19, 1988 to Johnson. Johnson teaches an automobile steering wheel lock including inner and outer telescoping wheel spanning members, each having one outwardly opening hook for engaging the steering wheel rim. A locking mechanism is provided in the outer wheel spanning member to engaging any one of a series of locking recesses along the inner wheel spanning member, for locking the members at any of several extensions to fit various size wheels. A problem with Johnson is that the simple key lock is susceptible to being picked. Another problem is that a thief can quickly employ a bolt cutter or other tool to cut through the steering wheel rim and slide one of the hooks through the resulting cut to remove the device. Another problem is that, even without removing the device, a thief can disconnect an air bag at the steering wheel hub and maneuver it past the wheel spanning members.

Another type of prior steering wheel lock includes two telescoping members, each having an inwardly opening hook at the member remote end. One hook is fit around the steering wheel rim and the other is fit around the brake pedal lever. Then the members are secured together with a lock at this telescopic extension. A problem with this design is that the apparatus can sometimes be forcibly removed by pulling and bending the brake pedal lever to permit unhooking of the wheel rim or of the pedal lever.

It is thus an object of the present invention to provide a vehicle steering wheel and air bag antitheft locking apparatus which includes a virtually pick-proof lock.

2

It is another object of the present invention to provide such an apparatus which cannot be forcibly removed by bending a pedal lever or by sliding wheel rim engaging hooks to and through a cut in the wheel rim.

It is still another object of the present invention to provide such an apparatus which obstructs unauthorized removal of a wheel-mounted air bag while the apparatus is installed.

It is finally an object of the present invention to provide such an apparatus which is sturdy, reliable and which can be manufactured at a cost to be competitive with existing steering wheel locks, thereby providing additional and superior protection at a very competitive price.

SUMMARY OF THE INVENTION

The present invention accomplishes the above-stated objectives, as well as others, as may be determined by a fair reading and interpretation of the entire specification.

A steering wheel and air bag antitheft locking apparatus is provided for preventing theft of a vehicle having a steering wheel with a wheel rim and a wheel spoke, including a tubular outer wheel spanning member having a receiving end and a handle end; an elongate inner wheel spanning member having an entry end and an outwardly protruding end, the entry end being telescopingly fitted into the outer wheel spanning member receiving end; where the inner wheel spanning member protruding end has attached a first outwardly opening wheel rim engaging hook (preferably but not essentially a pair); where one of the handle end and the protruding end protrudes substantially radially from the steering wheel when the apparatus is engaged to prevent turning of the steering wheel sufficiently to drive the vehicle; and where a second outwardly opening wheel rim engaging hook (preferably but not essentially a pair) attached to the outer wheel spanning member between the receiving end and the handle end; and a key operated locking mechanism which releasibly secures the inner and outer wheel spanning members together at any of several telescopic extensions, the locking mechanism including a key passageway; and a key for operating the locking mechanism including at least three radially extending key edged flanges. Each of the key edged flanges preferably has a cut different from the remaining key edged flanges.

A steering wheel and air bag antitheft locking apparatus is further provided for preventing theft of a vehicle having a steering wheel with a wheel rim and a wheel spoke, including a tubular outer wheel spanning member having a receiving end and a handle end; an elongate inner wheel spanning member having and entry end and an outwardly protruding end, the entry end being telescopingly fitted into the outer wheel spanning member receiving end; where the inner wheel spanning member protruding end has an attached first pair of laterally spaced apart and outwardly opening wheel rim engaging hooks; where one of the handle end and the protruding end protrudes substantially radially from the steering wheel when the apparatus is engaged to prevent turning of the steering wheel sufficiently to drive the vehicle; and where a second pair of laterally spaced apart and outwardly opening wheel rim engaging hooks is attached to the outer wheel spanning member between the receiving end and the handle end; so that the wheel engaging hooks of each pair straddle the steering wheel spoke while engaging the steering wheel rim, to prevent a thief from removing the apparatus by cutting through the wheel rim and sliding one pair of hooks to and through the cut. Each pair of hooks is preferably a single U-shaped member having hook-shaped legs.

A steering wheel and air bag antitheft locking apparatus for preventing theft of a vehicle having a steering wheel with a wheel rim, a wheel spoke and an air bag, including a tubular outer wheel spanning member having a receiving end and a handle end; an elongate inner wheel spanning member having an entry end and an outwardly protruding end, the entry end being telescopingly fitted into the outer wheel spanning member receiving end; where the inner wheel spanning member protruding end has an attached first outwardly opening wheel rim engaging hooks; where one of the handle end and the protruding end protrudes substantially radially from the steering wheel when the apparatus is engaged to prevent turning of the steering wheel sufficiently to drive the vehicle; and where second outwardly opening wheel rim engaging hooks are attached to the outer wheel spanning member between the receiving end and the handle end; and an air bag protecting structure including a shielding member extending laterally from the outer wheel spanning member, substantially perpendicular to the first pair of hooks at the handle end, so that when the apparatus is secured onto the steering wheel, the shielding member is automatically positioned over the air bad and blocks removal of the air bag. The shielding member preferably includes two opposing and outwardly bowed U-shaped loop members.

BRIEF DESCRIPTION OF THE DRAWINGS

Various other objects, advantages, and features of the invention will become apparent of those skilled in the art from the following discussion taken in conjunction with the following drawings, in which:

FIG. 3 is a perspective view of the preferred unified wheel rim engaging hook pair structure.

FIG. 4 is a cut-away view of the cylinder retaining barrel, revealing the latch port and the recess engaging element.

FIG. 5 is a perspective view of the inventive four flanged key design.

DETAILED DESCRIPTION OF THE PREFERRED EMBODIMENTS

Figure 1:
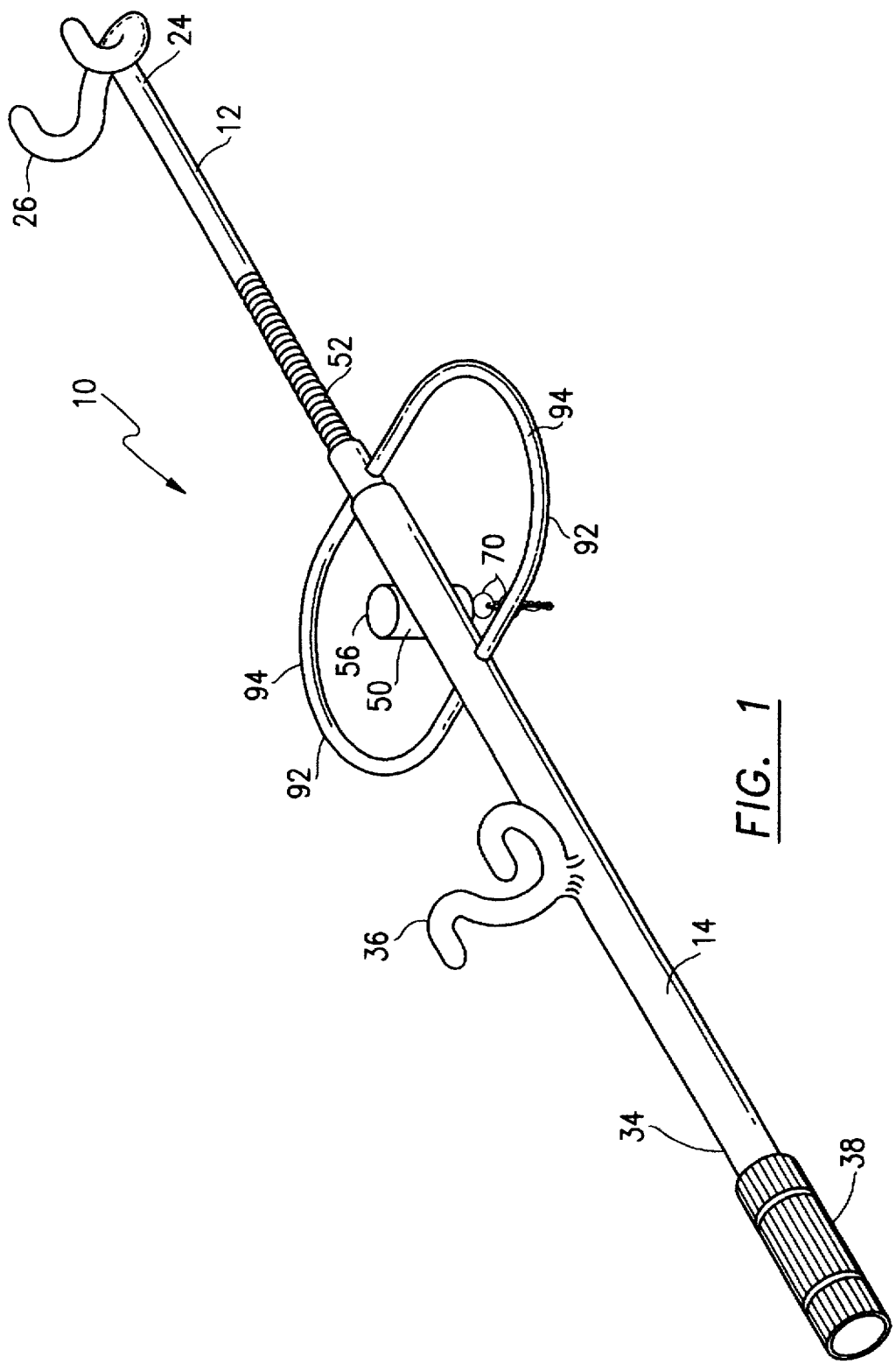
FIG. 1 is a perspective view of the preferred embodiment of the inventive steering wheel and air bag antitheft locking apparatus.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGS. are designated by the same reference numerals.

Referring to FIGS. 1-5, a steering wheel and air bag antitheft locking apparatus 10 is disclosed. Apparatus 10 includes an elongate inner wheel spanning member 12 telescopingly fitted into a tubular outer wheel spanning member 14, both preferably made of hardened steel. Inner wheel spanning member 12 has an entry end 22, which slides into outer wheel spanning member 14, and has a protruding end 24. Welded to protruding end 24 is a first pair 26 of laterally spaced apart and outwardly opening wheel rim engaging hooks. Outer wheel spanning member 14 has a receiving end 32, which receives the inner wheel spanning member entry end 22, and has a handle end 34 covered by a hand grip 38. When apparatus 10 engages a steering wheel 40, handle end 34 protrudes substantially radially from the steering wheel 40 a sufficient distance to prevent wheel 40 rotation necessary to drive the vehicle. A second pair of 36 laterally spaced apart and outwardly opening wheel rim engaging hooks is welded to outer wheel spanning member 14 substantially midway between receiving end 32 and the handle end 34. See FIGS. 1 and 2. Each pair 26 and 36, respectively, of hooks is preferably joined as a substantially U-shaped member with hook shaped legs. See FIG. 3.

The wheel engaging hooks of each pair 26 and 36, respectively, preferably straddle an existing steering wheel spoke 42 while engaging the steering wheel rim 44. Straddling a spoke 42 prevents a thief from removing apparatus 10 by using a cut through the wheel rim 44 and sliding hooks at one end of apparatus 10 to and through the cut.

Figure 2:
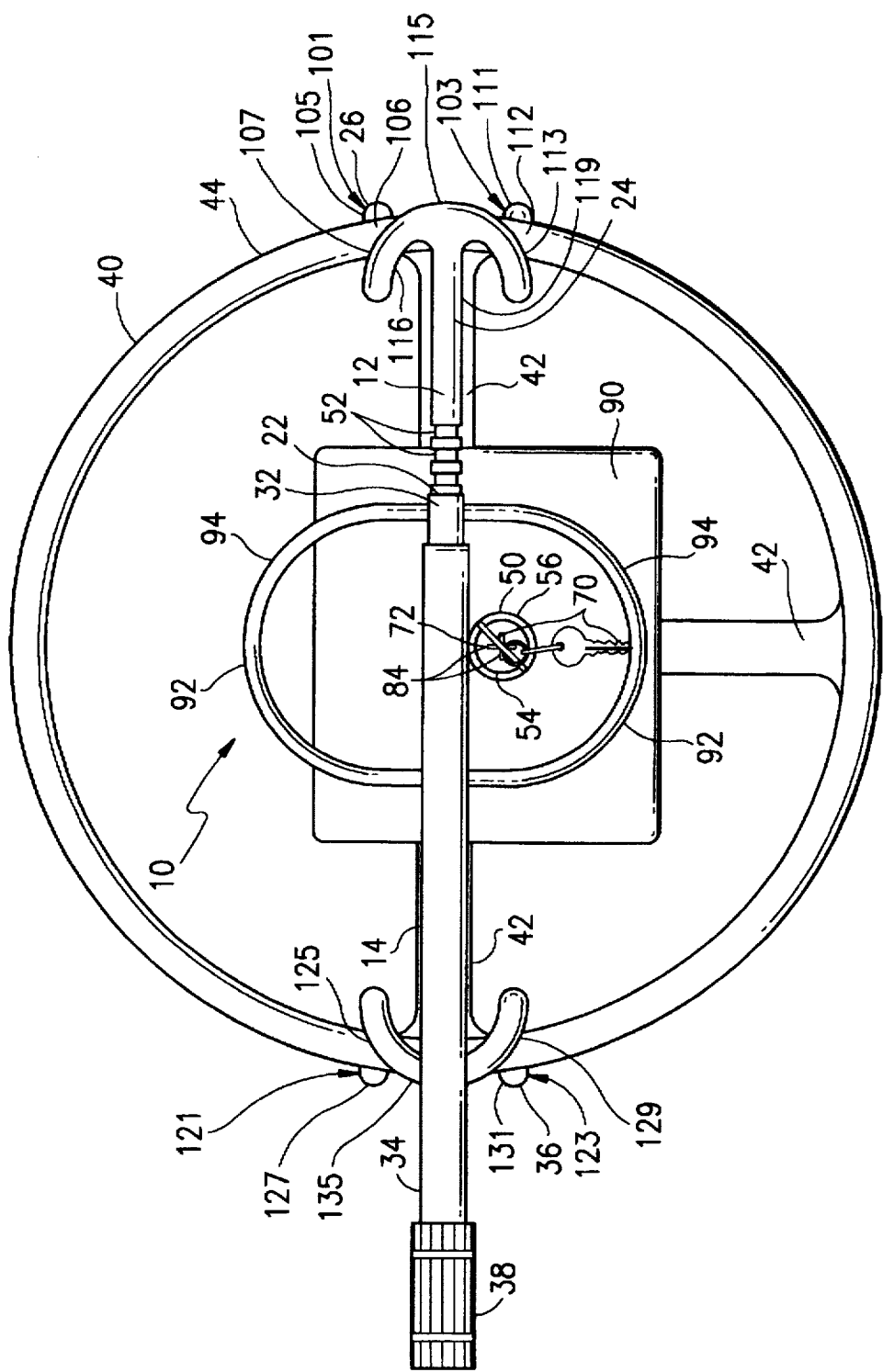
FIG. 2 is a perspective view of a steering wheel equipped with an air bag and locked with the preferred embodiment of the apparatus.

As best shown in FIG. 2, hook pair 26 includes upper hook 101 and laterally spaced apart lower hook 103. Each hook, 101, 103, which is outwardly facing with respect to air bag 90 and the underlying steering wheel column, has substantially co-planar hook legs. As shown in FIG. 2, hook leg 105 is generally co-planar with respect to hook leg 107. An imaginary plane formed by hook legs 105, 107 is generally perpendicular to the imaginary plane formed by the steering wheel rim 44. In a similar manner, hook legs 111 and 113 of outwardly facing hook 103 are substantially co-planar. Hook legs 105, 107 cover wheel rim arcuate segment 106 and hook legs 111, 113 cover wheel rim arcuate segment 112. As shown, these hook legs 105, 107 and 111, 113 wrap around rim arcuate segments 106, 112 at least 180 degrees thereby limiting exposure of the arcuate segments to only radially external or outboard faces.

The laterally spaced apart hooks 101, 103 are joined together by a wheel rim overlay member 115. Rim overlay member 115 is generally U-shaped with the base of the U protruding beyond steering wheel rim 44 such that overlay member 115 covers an adjacent wheel rim arcuate segment 116. The lateral span of U-shaped overlay member 115 spans the lateral steering wheel spoke span 119. As such, laterally spaced apart hooks 101, 103 trap spoke 42 therebetween. As shown in FIG. 2, three wheel rim arcuate segments 106, 112 and 116 are covered by this hook assembly.

In a similar manner with respect to hook pair 36, this pair includes two, laterally spaced apart, outwardly facing hooks 121, 123, each having respectively co-planar hook legs 125, 127 and 129, 131 covering associated wheel rim arcuate segments. These hooks 121, 123 are joined together with a U-shaped rim overlay member 135 which has a base protruding radially beyond the wheel rim 44 such that it covers a further wheel rim arcuate segment.

Outer wheel spanning member receiving end 32 includes a key operated lock 50 which engages any one of a series of locking recesses 52 formed along the inner wheel spanning member entry end 22 for locking wheel spanning members 12 and 14 together at a desired longitudinal extension. Lock 50 preferably includes a locking cylinder 54 and a cylinder retaining barrel 56 structure welded perpendicularly to a side of outer wheel spanning member receiving end 56. A latch port 62 opens through cylinder retaining barrel 56 and through receiving end 32 to expose an immediately adjacent locking recess 52 to the interior of cylinder retaining barrel 56. See FIG. 4. A conventional latching mechanism (not shown) is contained within retaining barrel 56 and a portion of a locking recess engaging element 64, such as a bolt or a ball bearing, protrudes through latch port 62 to releasibly engage whichever locking recess 52 is positioned immediately adjacent to latch port 62. This general type of lock construction is conventional and known in the art. Movement of the engaging element 64 between recess 52 engaging and non-engaging positions is accomplished by rotation of locking cylinder 54 within retaining barrel 56 in one or the other rotational direction. Locking cylinder 54 is freed to rotate and thereby to lock and unlock wheel spanning members 12 and 14 by insertion and rotation of a key 70 within an axial key passageway 72 in locking cylinder 54.

The key 70 includes a four flanged lock operating portion 74 extending longitudinally from a planar finger gripping portion 76. See FIG. 5. The lock operating portion 74 has a central longitudinal axis and four mutually perpendicular and individually distinct key edged flanges 82 extending radially from the lock operating portion 74 central longitudinal axis L. The locking cylinder axial key passageway 72 has a passageway longitudinal axis J and four radially extending and mutually perpendicular flange receiving slots 84, each slot 84 corresponding and mating with exactly one of the individually distinct key edged flanges 82. As a result, the key 70 releases cylinder 54 to rotate only if inserted into key passageway 72 the one way that matches the individual key edged flanges 82 to the corresponding individual slots 84. The key 70 can only be inserted into the flange receiving slots one way because one of the key edged flanges is thicker than the other three, and there is only one flange receiving slots 84 that is thick enough to receive it. This unique construction makes lock picking and unauthorized key duplication extremely difficult, if not impossible.

Outer spanning member 14 preferably includes an air bag 90 protecting structure 92 in the form of two opposing and outwardly bowed, rigid U-shaped loops 94 extending laterally from outer wheel spanning member receiving end 32, perpendicular to the first pair 26 of hooks at handle end 34. See FIGS. 1 and 2. When apparatus 10 is secured onto a steering wheel 40, loops 94 are automatically positioned over air bad 90 and block removal of air bag 90.

Apparatus 10 is preferably made of heavy gauge stainless steel to resist removal by sawing through a hook pair 26 or 36, or through a wheel spanning member 12 or 14. A blank pin engaging portion preferably takes the form of a solid metal cylinder, from which metal is cut away to form the four key edged flanges 82. Wheel spanning members 12 and 14 are preferably painted a bright color for ready visibility and theft deterrence.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A steering wheel antitheft locking apparatus for preventing theft of a vehicle having a steering wheel with a wheel rim and at least a first and a second wheel spoke, each wheel spoke having lateral spoke span adjacent said wheel rim and an air bag disposed atop said first and second wheel spoke, comprising:

a tubular outer wheel spanning member having a receiving end and a handle end;

a first pair of laterally spaced apart, outwardly facing hooks joined together by a first wheel rim overlay member and mounted to said outer wheel spanning member between said receiving end and said handle end, said first wheel rim overlay member spanning the lateral spoke span of said first wheel spoke and an adjacent wheel rim arcuate segment such that said first pair of hooks trap said first wheel spoke therebetween, each hook of said first pair of hooks having substantially co-planar hook legs which wrap at least 180 degrees around a corresponding wheel rim arcuate segment therebetween;

an elongate inner wheel spanning member having an entry end and an outwardly protruding end, said entry end being telescopingly fitted into said outer wheel spanning member receiving end;

one of said handle end and said protruding end protrudes substantially radially from said steering wheel when said apparatus is engaged to prevent turning of said steering wheel sufficiently to drive said vehicle;

a second pair of laterally spaced apart, outwardly facing hooks joined together by a second wheel rim overlay member and mounted to said inner wheel spanning member, said second wheel rim overlay member spanning the lateral spoke span of said second wheel spoke and a respective adjacent wheel rim arcuate segment such that said second pair of hooks trap said second wheel spoke therebetween, each hook of said second pair of hooks having substantially co-planar hook legs which wrap at least 180 degrees around a corresponding wheel rim arcuate segment therebetween:

a key operated locking mechanism which releasably secures said inner and outer wheel spanning members together at any of a plurality of telescopic extensions; and, an air bag protecting structure including a shielding member integral with and extending laterally from said outer wheel spanning member and disposed within said wheel rim, substantially perpendicular to said first pair of laterally spaced apart, outwardly facing hooks, such that when said first pair of hooks trap said first wheel spoke therebetween, said shielding member is automatically positioned over said air bag and blocks removal of said air bag.

2. The steering wheel antitheft locking apparatus of claim 1, wherein each said hook of said first and second pair of hooks is a single solid and unitary U-shaped member.

3. The steering wheel antitheft locking apparatus of claim 1, wherein said shielding member includes two opposing and outwardly bowed U-shaped loop members.

4. The steering wheel antitheft locking apparatus as claim 1, wherein said shielding member includes a first and a second U-shaped loop both disposed in a singular plane atop a plane established by said steering wheel rim, each of said first and second loop having a radial loop dimension substantially greater than one-half of the lateral dimension of said air bag.

5. The steering wheel antitheft locking apparatus as claim 1, wherein each leg of said first and second U-shaped loops is perpendicular to said first and said second pairs of spaced apart, outwardly facing hooks.

* * * * *